United States Patent
Sprecher et al.

(10) Patent No.: US 12,498,691 B2
(45) Date of Patent: Dec. 16, 2025

(54) ROTARY TABLE COMPENSATION

(71) Applicant: HEXAGON TECHNOLOGY CENTER GMBH, Heerbrugg (CH)

(72) Inventors: Markus Sprecher, Grabserberg (CH); Marcel Rohner, Heiden (CH); Michael Zapp, Saarlouis (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 344 days.

(21) Appl. No.: 17/402,121

(22) Filed: Aug. 13, 2021

(65) Prior Publication Data

US 2022/0050436 A1   Feb. 17, 2022

(30) Foreign Application Priority Data

Aug. 14, 2020 (EP) .................................. 20191113

(51) Int. Cl.
*G05B 19/401* (2006.01)
*G01B 5/008* (2006.01)
*G01B 21/04* (2006.01)

(52) U.S. Cl.
CPC ........... *G05B 19/401* (2013.01); *G01B 5/008* (2013.01); *G01B 21/042* (2013.01);
(Continued)

(58) Field of Classification Search
CPC ........ G05B 19/401; G05B 2219/35408; G05B 2219/49344; G05B 2219/50139;
(Continued)

(56) References Cited

U.S. PATENT DOCUMENTS

| | | | |
|---|---|---|---|
| 6,519,860 B1 | 2/2003 | Bieg et al. | |
| 9,316,473 B2 * | 4/2016 | Jensen | G01B 5/012 |

(Continued)

FOREIGN PATENT DOCUMENTS

| | | |
|---|---|---|
| CN | 103591913 A | 2/2014 |
| CN | 104864827 A | 8/2015 |

(Continued)

OTHER PUBLICATIONS

Ibaraki, Soichi, and et al. "A machining test to identify rotary axis geometric errors on a five-axis machine tool with a swiveling rotary table for turning operations." Precision Engineering 55 (2019): 22-32 (Year: 2019).*

(Continued)

*Primary Examiner* — Douglas Kay
(74) *Attorney, Agent, or Firm* — Maschoff Brennan

(57) ABSTRACT

A Coordinate Measuring Machine (CMM) system comprising a CMM, a rotary table, and a rotation arrangement, wherein the CMM system is configured to be calibrated by determining the 6 dof pose of a jig, and to a method for calibrating. The jig may be mounted such that a current pose of the jig is associated with a current pose of the rotary table with respect to the CMM. The rotary table may be moved into multiple poses, and the 6 dof pose of the jig is measured for each of the multiple poses of the rotary table. An error map is generated, based on the angles associated with the poses of the rotary table, and is used to generate a coordinate transformation from the CMM coordinate system to the part coordinate system, which is associated with the rotary table, based on the error map.

14 Claims, 5 Drawing Sheets

(52) U.S. Cl.
CPC .. *G01B 21/045* (2013.01); *G05B 2219/35408* (2013.01); *G05B 2219/49344* (2013.01); *G05B 2219/50139* (2013.01); *G05B 2219/50156* (2013.01)

(58) Field of Classification Search
CPC .......... G05B 2219/50156; G01B 5/008; G01B 5/0016; G01B 21/042; G01B 21/00; G01B 21/045; G01B 11/005
See application file for complete search history.

(56) References Cited

U.S. PATENT DOCUMENTS

| | | | |
|---|---|---|---|
| 9,746,303 B2 | 8/2017 | Nakagawa et al. | |
| 9,797,706 B2* | 10/2017 | Jordil | G01B 21/047 |
| 10,591,271 B2 | 3/2020 | Held et al. | |
| 10,801,825 B2 | 10/2020 | Sagemüller | |
| 10,824,131 B2* | 11/2020 | Schranz | G01B 5/008 |
| 10,942,020 B2* | 3/2021 | Meile | G01B 5/008 |
| 11,247,305 B2 | 2/2022 | Kojima et al. | |
| 2011/0040523 A1* | 2/2011 | Matsushita | G01B 21/045 |
| | | | 702/152 |
| 2013/0050701 A1* | 2/2013 | Jensen | G01B 11/007 |
| | | | 356/612 |
| 2015/0051862 A1* | 2/2015 | Jonas | G01B 21/045 |
| | | | 702/97 |
| 2016/0195389 A1* | 7/2016 | Sagemueller | G05B 19/40133/503 |
| 2016/0223316 A1* | 8/2016 | Jordil | G01B 11/005 |
| 2018/0150049 A1* | 5/2018 | Schranz | G01B 21/042 |
| 2021/0216086 A1* | 7/2021 | Kou | G05D 3/20 |

FOREIGN PATENT DOCUMENTS

| | | |
|---|---|---|
| CN | 106197283 A | 12/2016 |
| CN | 107407557 A | 11/2017 |
| CN | 107810382 A | 3/2018 |
| CN | 107957236 A | 4/2018 |
| CN | 109500619 A | 3/2019 |
| CN | 109596073 A | 4/2019 |
| CN | 109655023 A | 4/2019 |
| CN | 110108208 A | 8/2019 |
| DE | 102012205599 A1 | 10/2013 |
| DE | 10 2015 212 265 A1 | 1/2017 |
| EP | 3327524 A1 | 5/2018 |
| KR | 10-2016-0100013 A | 8/2016 |

OTHER PUBLICATIONS

Fan, Kuang-Chao, and et al. "Techniques of multi-degree-of-freedom measurement on the linear motion errors of precision machines." Advanced Optical Technologies 3, No. 4 (2014): 375-386 (Year: 2014).*
European Search Report dated Jan. 26, 2021 as received in application No. 20 19 1113.
Baraki Soichi et al: "A machining test to identify rotary axis geometric errors on a five axis machine tool with a swiveling rotary table for turning operations", Precision Engineering, Elsevier, Amsterdam, NL, Aug. 11, 2018.
CN Office Action dated Feb. 26, 2024 as received in Application No. 202110880737.7.
Sun Zhenggen et al., "The CNC Machine Tool Operator Handbook," Machinery Industry Press, pp. 9 (Oct. 2012).
Li Haiyue et al., "Mechanical Engineering Training," Machinery Industry Press, pp. 156 (Aug. 2018).
Zhu Min, "Engineering Training," Southwest Jiaotong University Press, pp. 209 (Jul. 2019).
https://c.jgvogel.cn/apisensor/c/2019-03-07/1018839.shtml.
https://www.apimetrology.com.cn/smart-track/ or https://product.mmsonline.com.cn/profile/50848845f863c53ede50b13082513e64.shtml.
CN Office Action dated Jun. 29, 2024 as received in Application No. 202110880737.7.
CN Decision of Rejection dated Jan. 6, 2025 as received in Application No. 202110880737.7.
S. Umeyama, IEEE Trans Pattern Anal. Mach. Intel., 13/4 (1991) pp. 376-380.

* cited by examiner

ROTARY TABLE COMPENSATION

FIELD

The present disclosure relates to a Coordinate Measuring Machine (CMM) system for measuring the geometry of a physical object by sensing features on the surface of the object with a sensor, in particular to a CMM system which is configured to perform a calibration method, as well as to a calibration method for a Coordinate Measuring Machine (CMM) system. Furthermore, the present invention relates to a computer program product with a program code to be stored on a Coordinate Measuring Machine (CMM), or computer-data-signal for the implementation of a calibration method.

BACKGROUND

A Coordinate Measuring Machine (CMM) is a machine, which is configured to measure the 3D coordinates of certain points on the surface of an object. CMM's are of importance in various industrial fields and are applied for example in production measuring technology, e.g. to determine deviations of the geometry of a manufactured work piece from the theoretical model of said work piece and survey if the deviation is within a defined tolerable limit, to detect fabrication defects, to determine the achievable accuracy in a certain production process, or to measure the wear and abrasion which occurs during the lifetime of an object e.g. of turbine blades. An object could e.g. be a work piece which is suitable to be measured with a CMM.

Typically, a CMM has a main structure, a probing system, and a data collection and data processing system. One example of a CMM which is used in industrial fields, e.g. in production measuring technology, is a 3-axis CMM. A 3-axis CMM is built such, that the main structure includes three axes of motion in order to enable the CMM to measure the 3D coordinates of an object. The main structure conventionally includes a basis with a measuring table on which the object is positioned, a movable frame which is mounted to the basis such that it can be moved along a first axis, a component, herein referred to as arm, which is mounted to the movable frame in a movable way, and is shiftable along a second axis which is nominally perpendicular to the first axis of movement of the frame. The arm contains a probing system, say a scanning head comprising a sensor, which is movable along a third axis, e.g. wherein the third axis is nominally perpendicular to the first and second axis of movement of the CMM, thereby allowing the sensor to be moved along three axes and enabling the CMM to measure the 3D coordinates of an object. Motors are commonly built into CMM's for driving each axis. The data collection and processing system typically includes a machine controller, desktop computer and application software.

Further elaborated construction designs are realised, the above described 3-axis variant is to be seen only as an example of the most common design and principle of a CMM.

For measuring surface variations of an object a probe head is used, e.g. comprising a tactile or optical sensor. A tactile sensor can e.g. be realised as a spring-loaded steel or ruby ball stylus, and is in some state of the art documents also referred to as probe. As the tactile sensor touches the surface of the object, the stylus is deflected and sends the X, Y and Z coordinate information to the computer. Another measurement method is to drag the tactile sensor along the surface of the object and measure the 3D coordinates at specified intervals, these tactile sensors are also known as scanning probes. For example, this scanning method may be beneficial over the conventional touch-probe method in terms of accuracy and most times also in terms of efficiency. Furthermore, optical sensors such as for example laser sensors can be used for distance measurements and thus determination of the 3D coordinates of an object.

A CMM often combines different types of sensors, and is then called a multisensor-measuring machine. This can include various types of sensors, e.g. tactile sensors or optical sensors, including e.g. laser, camera, video, white light sensors, to provide what is known as multisensor measurement. Depending on the geometry of the object, different sensors can advantageously be used for the measurement.

However, some points at the surface of said object can be difficult or impossible to reach with above described conventional 3-axis model of a CMM, thus slowing down the measuring process or even making the measurement of some 3D points impossible. In many cases the object to be measured needs to be accessible from all sides, and also difficult to reach points of the object need to be measured. In order to simplify the reachability of every 3D point of the object and speed up the measuring process, e.g. a 5 axis probe head can be employed. Difficulties arise especially when inspecting parts which require multiple sensor changes such as very small and complex parts. Such parts as well as crankshafts, camshafts, screw compressors, turbine disks and blisks can for example be measured using a rotary table. Use of a rotary table on a CMM can increase CMM capacity, reduce inspection time and boost the range of applications, due to a reduced measurement volume. Instead of using a single rotary table, also stacked rotary tables can be used, e.g. to align an object to be measured with respect to a sensor. For example, if a multisensor system is present, rotary tables can be used to allow perpendicular probing of the work piece surface with sensors, which are fixedly aligned with respect to one of the CMM axes. Furthermore, if e.g. one of the sensors is an optical sensor, such as in a camera, a rotary table also allows to align an object to be measured with respect to the focal plane of a camera.

Despite the positive effects e.g. regarding the accessibility of the object, each additional axis which is added to the CMM or CMM system, such as e.g. that of a rotary table, is another potential source of error. A CMM or CMM system is subject to various error-inducing factors, e.g. dynamic thermal and mechanical stress, changing humidity, inconsistent and nonlinear material response, and inappropriate human input. Thus, index errors, wobble errors and eccentricity errors, as well as errors due to the weight of the object, which is mounted to a rotary table, can arise. Therefore, in the prior art, error maps of rotary tables are either factory calibrated, wherein an error map could be any well-defined function, which provides the corrected 3D coordinates of an object for every angular position of the rotary table, or the rotary tables are constructed to be long-term stable, thereby leading to increased technical outlay. Constructing the rotary tables such, that the errors are decreased, means the construction has to be long-term stable to avoid frequent re-mapping, and sufficiently stiff in order to avoid measurement errors due to the load of objects, e.g. work pieces, thereby leading to high costs.

In order to correct the errors, the isometry, respectively transformation from a part coordinate system which is fixed with respect to the object to be measured, and a CMM coordinate system which is associated with a CMM have to be known. Together with the known pose of the rotary table, the object coordinates can then be determined. According to the state of the art, the transformation parameter can be derived from the known geometry mechanical setup, positioning of the one or more rotary tables within the CMM system, and a rotation position feedback in each rotary table. In the prior art, typically error maps for individual components, e.g. the rotary table rotation joints, are factory calibrated. However, the measuring accuracy of the rotary tables is limited due to systematic errors, e.g. translation and angle errors. In other words, the errors of the CMM and the errors of the rotary table are determined, however, the measuring inaccuracy arising from the mechanical connection of the rotary table and the CMM is not considered and thus remains.

SUMMARY

It is therefore an object of some embodiments to provide a Coordinate Measuring Machine (CMM) system comprising a rotary table, as well as a method, which allows improved accuracy and overall measuring robustness.

Furthermore, it is an object of some embodiments to provide a Coordinate Measuring Machine (CMM) system comprising a rotary table, as well as a method, which reduces technical outlay and/or provides a higher measuring accuracy compared to the state of the art.

Another object of some embodiments is to provide a Coordinate Measuring Machine (CMM) system comprising a rotary table, as well as a method, which improves the measuring accuracy, even if further rotation axes and thus error sources are added to the system.

These objects are achieved by realising at least part of the features of the independent claims. Features which further develop some embodiments in an alternative or advantageous manner are described in the dependent patent claims.

Some embodiments relate to an approach which allows the customer to autonomously, simply and frequently calibrate a rotary table and/or rotation arrangement in a CMM system. The inventive CMM system and method thus offers a possibility for a frequent adjustment of errors by frequently generating an error map. In this error map the deviations of the real, measured 6 degrees of freedom (6 dof) pose of a jig from the theoretically assumed 6 dof of a jig are registered, by measuring the deviations of the jig at various rotation angles, determining the 3D coordinates respectively the 6 dof pose of the jig with a sensor of the CMM, and resultant generating a coordinate transformation from a part coordinate system, a coordinate system which is fixed in relation to the rotary table, to a CMM coordinate system, a coordinate system which is fixed with respect to the basis of the CMM. The inventive CMM system generates the isometry from the part coordinate system to the CMM coordinate system, and vice versa, with high accuracy, and thus allows for error correction of the measurement. The inventive approach further allows to install lower precision and lower cost bearings, but still achieve a higher measuring accuracy compared to using more precise bearings in combination with a state of the art calibration. Furthermore, the inventive approach allows for an overall calibration of the whole CMM system, including not only a compensation of the errors of the rotary table, but a compensation of the whole setup respectively mechanical fixation on the CMM. Besides the possibility for an overall calibration of the whole CMM system, the inventive approach leads to a decrease in costs since e.g. wobble errors and errors of eccentricity of the rotary table can be frequently measured and corrected by the customer. Since the inventive approach employs the CMM itself as a reference system, only a low cost jig is required for the calibration procedure. Furthermore, the jig itself does not need to be accurately known, the only requirement is, that it is either geometrically stable during the calibration process, or that the behaviour of the jig during the calibration procedure is known.

More detailed, the some embodiments relate to a Coordinate Measuring Machine (CMM) system operable to measure an object, the CMM system comprising a CMM being associated with a CMM coordinate system which is fixed with respect to the CMM, the CMM comprising a computing unit and at least one sensor for the determination of 3-dimensional coordinates of an object, in particular a tactile sensor or an optical sensor, a rotary table exhibiting means for holding an object and being associated with a part coordinate system, which is fixed with respect to the rotary table, a rotation arrangement configured to move the rotary table into different poses with respect to the CMM by means of a rotation movement, a jig configured to be used for the determination of its 6 degrees of freedom (6 dot) pose with the at least one sensor of the CMM, and arranged with respect to the rotary table such that a current pose of the jig is associated with a current pose information of the rotary table with respect to the CMM, particularly wherein the jig is part of the rotary table or mountable to the rotary table, characterised in that the CMM system is configured to perform, in particular automatically perform, a calibration procedure, the procedure comprising moving the rotary table into multiple poses by setting different angular positions with respect to the rotation movement, measuring the 6 dof pose of the jig with the CMM for each of the multiple poses of the rotary table, generating an error map with the computing unit, based on the angles associated with the different angular positions, and the associated 6 dof poses of the jig, and determining, particularly automatically determining, with the computing unit the coordinate transformation from the CMM coordinate system to the part coordinate system, based on the error map.

The rotary table could either be mounted directly to the basis, or could be mounted to the basis via interjacent components. According to one embodiment, a Coordinate Measuring Machine (CMM) system is characterised in that the rotation arrangement is configured as single axis arrangement, wherein the rotary table is mounted directly to a basis, the basis is mounted to the CMM, and the setting of different angular positions comprises rotating the rotary table around a first axis of rotation with respect to the basis.

According to another embodiment, a Coordinate Measuring Machine (CMM) system according to the present invention is characterised in that the rotation arrangement is configured as dual axis arrangement, wherein the rotary table is mounted to a basis via an interjacent swivel arm, wherein the swivel arm is mounted to the basis and is rotatable with respect to the basis around a first axis of rotation, the rotary table is mounted to the swivel arm and rotatable about a second axis of rotation, wherein the swivel arm is constructed, such that the first axis of rotation and the second axis of rotation are nominally perpendicular to each other, wherein the moving of the rotary table into multiple poses comprises rotating the swivel arm and/or the rotary table around the first respectively the second axis of rotation.

According to one embodiment, multiple rotary tables can also be stacked on each other, either directly or via interjacent components, the rotation axes of the multiple rotary tables preferably being nominally perpendicular to at least one of the rotation axis of the other rotary tables of the CMM system.

The calibration procedure may e.g. be performed in an automated way, since automation of the process further simplifies the calibration for the costumer, also leading to a further decrease in time, and reduces the proneness to error due to operating errors. According to one embodiment, the coordinate transformation from the CMM coordinate system to the part coordinate system, resulting from the calibration procedure, is described by an angle-dependent matrix, which takes errors of the rotation axes, such as e.g. index errors, wobble errors and translational errors into account, the matrix being $CT_\alpha$ if the rotation arrangement is configured according to the single axis arrangement, wherein $\alpha$ is the rotation angle of the rotary table around the first axis of rotation, or $CT_{\alpha,\beta}$ if the rotation arrangement is configured according to the dual axis arrangement, wherein $\alpha$ is the rotation angle of the swivel arm around the first axis of rotation and $\beta$ is the rotation angle of the rotary table around the second axis of rotation. $CT_\alpha$ respectively $CT_{\alpha,\beta}$ is the sum of a 3×3 angle-dependent rotation matrix multiplied with a 3×1 vector on which the coordinate transformation is applied, plus a 3×1 translation vector, e.g. if the rotation arrangement is configured as dual axis arrangement: $CT_{\alpha,\beta}=R_{\alpha,\beta}x+t_{\alpha,\beta}$ with $R_{\alpha,\beta}$ being the rotation matrix, x being the vector in which the rotation matrix is applied and $t_{\alpha,\beta}$ being the translation vector.

In some cases, the CMM system already comprises an application software for a state of the art coordinate transformation, the coordinate transformation possibly even taking index errors into account. In order to apply the approach of the disclosed embodiments, the state of the art coordinate transformation first has to be reversed. This could for example be done by deleting the application software and performing the state of the art coordinate transformation instead. Another possibility would be to first reverse the pre-installed state of the art coordinate transformation by multiplying it with its inverse, before applying the inventive coordinate transformation to the measured values. This composition of the coordinate transformation with the existing state of the art coordinate transformation, allows to integrate the inventive coordinate transformation into an existing work flow.

According to one embodiment, the CMM system comprises a software, the software having stored a coordinate transformation described by an angle-dependant matrix CT, wherein the rotation movement is assumed to be provided by ideally aligned and faultless rotation axes, wherein for the calibration procedure the coordinate transformation from the CMM coordinate system to the part coordinate system is described by an angle-dependent matrix, which takes errors of the rotation axes into account, the matrix being $CT_\alpha$ if the rotation arrangement is configured according to the single axis arrangement, wherein $\alpha$ is the rotation angle of the rotary table around the first axis of rotation, or $CT_{\alpha,\beta}$ if the rotation arrangement is configured according to the dual axis arrangement, wherein $\alpha$ is the rotation angle of the swivel arm around the first axis of rotation and $\beta$ is the rotation angle of the rotary table around the second axis of rotation, and wherein the coordinate transformation $CT_\alpha$, respectively $CT_{\alpha,\beta}$ is embedded into the software by providing an error map $CT^{-1} \circ CT_\alpha$, respectively $CT^{-1} \circ CT_{\alpha,\beta}$. The angle-dependent matrix CT could either describe a isometry wherein a rotation movement is assumed to be provided by ideally aligned and faultless rotation axes, but could also describe any pre-installed error compensation, which is reversed and substituted by an inventive isometry respectively coordinate transformation. CT could e.g. be a matrix where rotation axes of the rotation arrangement are estimated.

Not only the weight and dimensions of the components of the rotation arrangement, but also the weight and dimensions of the object which is mounted to the rotary table are a possible source of error. If e.g. the rotation arrangement is configured as dual axis arrangement wherein the rotary table is mounted to a basis via an interjacent swivel arm, and a heavy object is mounted to the rotary table, the axes could e.g. be tipped, tilted and/or shifted in comparison to the original configuration. In order to compensate for the mounted weight, the resulting errors can be determined by executing a measurement without any additional weight attached, and then mounting different kinds of weights to the rotary table, executing the inventive calibration procedure without a weight mounted to the rotary table, and accordingly for every mounted weight, and generating a weight-dependent error map. The weight of the mounted object could be determined for example by using an integrated balance, thus determining the weight directly on the CMM, or a user could manually input the weight of the mounted object. The weight dependent error map then leads to an even more accurate coordinate transformation.

In some cases only a partial calibration is required. From multiple degrees of freedom associated to a movement of the rotation arrangement, at least one of the parameters is assumed invariable, and the calibration procedure is performed based on the at least one parameter which is assumed variable. If e.g. the rotation arrangement is configured as dual axis arrangement wherein the rotary table is mounted to a basis via an interjacent swivel arm, and it is known that the interjacent swivel arm is the biggest source of error, rotating only the swivel arm in order to generate an error map depending only on the first axis of rotation, and neglecting the error arising from the rotation of the rotary table, respectively the rotation about the second axis of rotation, could provide a reasonable error map while reducing the time compared to a full calibration. Thus, at least one of the actuated axes is kept constant, and the parameters, which are associated with the actuated axis are determined. According to one embodiment, a Coordinate Measuring Machine (CMM) system is characterised in that the calibration procedure depends on multiple parameters.

In some cases, executing only a partial calibration regarding the weight can be beneficial. If e.g. the rotation arrangement is configured as dual axis arrangement wherein the rotary table is mounted to a basis via an interjacent swivel arm, and it is known that the interjacent swivel arm is the biggest source of error regarding the change of the weight, the weights can also be mounted to the swivel arm. The weights could also be mounted to any other component of the rotary arrangement. Executing a partial calibration of this kind is especially advantageous if the biggest source of error regarding the weight is known, and the said error is big compared to all the other errors, since the time needed for a partial calibration can be reduced compared to a full calibration.

According to one embodiment, a Coordinate Measuring Machine (CMM) system is characterised in that different kinds of weights are mounted to the rotary table or to a part of the rotation arrangement, wherein the CMM is configured to measure, in particular automatically measure, the 6 dof pose of the jig for different weights, wherein the 6 dof pose of the jig for each weight is measured for at least a subset of the different angular positions, and the CMM is configured to provide a weight-dependant correction to the coordinate transformation, in particular, wherein in case the rotation arrangement is configured according to the dual axis arrangement the subset of the different angular positions comprises a rotation of the swivel arm around the first axis of rotation and/or a rotation of the rotary table around the second axis of rotation. For the example of the dual axis arrangement this means, for every rotation angle around the first or the second axis of rotation and for every kind of weight, a deviation of the 6 dof pose of the jig is mapped, thereby generating an angle and weight dependent error map.

An error map could in general be any well-defined function, which provides the corrected 3D coordinate of an object for every angular position of the rotary table. According to one embodiment, a Coordinate Measuring Machine (CMM) system is characterised in that the error map is implemented using harmonic expansion, polynomial expansion or lookup tables.

A jig is an object which exhibits features to allow the determination of the 6 dof pose of at least parts of the rotation arrangement. According to one embodiment, a Coordinate Measuring Machine (CMM) system is characterised in that the jig is either a modular component, which is mountable to the rotary table, or the jig is fixedly mounted to the rotary table.

According to one embodiment, a Coordinate Measuring Machine (CMM) system is characterised in that the jig is geometrically stable during the calibration procedure, or the characteristics and behaviour of the jig during the calibration procedure are stored on the computing unit and taken into account. A jig could for example be a plate with at least three spheres mounted to the plate, a triangle on a plate, particularly a metallic triangle on a plate, a pattern, in particular a chessboard pattern, on a plate, or identical with the table or part of the table. If e.g. a part of the table is used as a jig, the 6 dof pose of the table could be determined, by taking into account the edges of the table. If e.g. a metallic triangle on a plate is used as a jig, determining the pose of two edges of said triangle suffices to determine the 6 dof pose of the jig. If e.g. a random non-planar surface on the plate is used as a jig, a surface fit could be used to determine the 6 dof pose of the jig. Also a pattern, e.g. a chessboard can be used as jig, the 6 dof pose of the jig can then for example be determined from images taken by a camera. The rotary table itself can also serve as a jig, e.g. when scanning the side, the top, and preferably an additional marker to break to rotational symmetry. Geometrically stable means, that the properties of the jig are such, that it is constant, respectively a change of the dimensions and/or shape of the jig can be neglected. Geometrically stable can thereby relate to a 2-dimensional jig such as e.g. a chessboard pattern or to a 3-dimensional jig, e.g. embodied as spheres. Among the characteristics which could be stored on the computing unit, could e.g. be the expansion coefficient, which defines the expansion of an object, regarding the change of temperature. Knowing the expansion coefficient of the material of which the jig is made of, could allow to predict the actual expansion of the jig during the calibration procedure.

According to one embodiment, a Coordinate Measuring Machine (CMM) system is characterised in that rotary table is embodied to function as a jig, the structural data of the rotary table are stored on the CMM, and the CMM is configured to perform, in particular automatically perform, a calibration procedure by using the structural data of at least part of the rotary table.

According to another embodiment, a Coordinate Measuring Machine (CMM) system is characterised in that the rotation arrangement is configured according to the dual axis arrangement, and the jig comprises at least two spheres, wherein at least one sphere is mounted to the swivel arm in close proximity to the basis, and at least one sphere is mounted to the swivel arm in close proximity to the rotary table. In close proximity to the basis could e.g. mean, that the sphere mounted to the swivel arm in close proximity the basis, is mounted such that the distance between the sphere and the basis is shorter than the distance between the sphere and the rotary table. In close proximity to the rotary table could accordingly mean, that the distance between the sphere and the rotary table is shorter than the distance between the sphere and the basis. The swivel arm could be L-shaped. In close proximity to the basis could for the example of an L-shaped swivel arm also mean, that the sphere is mounted on the straight part of the swivel arm, which is closer to the basis than the straight part of the swivel arm which is closer to the rotary table. More specifically, in close proximity to the basis could for the example of an L-shaped swivel arm also mean that the sphere is mounted on the straight part of the swivel arm, which is either directly or via an interjacent component mounted to the basis.

According to another embodiment, a Coordinate Measuring Machine (CMM) system is characterised in that the rotation arrangement is configured as dual axis arrangement, and the jig comprises at least three spheres, wherein at least one sphere is mounted to the swivel arm in close proximity to the basis, at least one sphere is mounted to the swivel arm or to an interjacent component between the swivel arm and the rotary table, in close proximity to the rotary table, and at least one sphere is directly or via an additional component mounted to the rotary table.

Depending on the jig and the object to be measured, different sensors can be advantageous for different jigs, respectively different measuring situations. According to one embodiment a Coordinate Measuring Machine (CMM) system is characterised in that the Coordinate Measuring Machine (CMM) comprises multiple sensors for the determination of 3-dimensional coordinates of an object, one of the sensors particularly being a tactile sensor or an optical sensor Some embodiments further relate to a calibration method for a Coordinate Measuring Machine (CMM) system, the CMM system comprising a CMM being associated with a CMM coordinate system which is fixed with respect to the CMM, and comprising a computing unit and at least one sensor for the determination of 3-dimensional coordinates of an object, in particular a tactile sensor or an optical sensor, a rotary table exhibiting means for holding an object and being associated with a part coordinate system, which is fixed with respect to the rotary table, a rotation arrangement configured to move the rotary table into different poses with respect to the CMM by means of a rotation movement, a jig configured to be used for the determination of its 6 degrees of freedom (6 dof) pose with at least one of the sensors of the CMM, and arranged with respect to the rotary table such that a current pose of the jig is associated with a current pose information of the rotary table with respect to the CMM, particularly wherein the jig is part of the rotary table or mountable to the rotary table, the method comprising the steps of moving the rotary table into multiple poses by setting different angular positions with respect to the rotation movement, measuring the 6 dof pose of the jig with the CMM for each of the multiple poses, generating an error map with the computing unit, based on the angles associated with the different angular positions, and the associated 6 dof poses of the jig, and determining with the computing unit the coordinate transformation from the CMM coordinate system to the part coordinate system, based on the error map. The rotary table could e.g. be moved into multiple poses automatically, by using a software stored on the computing unit, which implies to move the rotation table into multiple poses, respectively rotate the rotary table about multiple predefined angles around its rotation axes, wherein when a pre-set pose is set up, the 6 dof pose of the jig is measured. Measuring the 6 dof pose of the jig could e.g. also be executed automatically. Based on the measurement of the 6 dof pose of the jig an error map could be generated automatically, by the computing unit. The computing unit could then automatically determine the coordinate transformation from the CMM coordinate system to the part coordinate system. Although the single steps are preferably performed in an automated way, it is not mandatory that the whole calibration process is performed in an automated way. However, also the whole calibration method could be implemented such, that the process steps of the calibration method are performed fully automated, instead of only automating every single process step.

According to one embodiment, the calibration method for a Coordinate Measuring Machine (CMM) system is characterised in that the rotation arrangement is configured as single axis arrangement, wherein the rotary table is mounted to a basis, the basis is mounted to the CMM, and the setting of different angular positions comprises rotating the rotary table around a first axis of rotation with respect to the basis, or dual axis arrangement, wherein the rotary table is mounted to a basis via an interjacent swivel arm, wherein the swivel arm is mounted to the basis and is rotatable with respect to the basis around a first axis of rotation, the rotary table is mounted to the swivel arm and rotatable about a second axis of rotation, wherein the swivel arm is constructed, such that the first axis of rotation and the second axis of rotation are nominally perpendicular to each other, wherein the moving of the rotary table into multiple poses comprises rotating the swivel arm and/or the rotary table around the first respectively the second axis of rotation.

According to another embodiment, the calibration method is characterised in that the method is computer-implemented, and comprises providing a software for the Coordinate Measuring Machine (CMM) system, the software having stored a coordinate transformation described by an angle-dependent matrix CT, wherein the rotation movement is assumed to be provided by ideally aligned and faultless rotation axes, wherein for the calibration procedure the angle-dependant coordinate transformation from the CMM coordinate system to the part coordinate system is described by a matrix, which takes the tilting errors of the rotation axes into account, the matrix being $CT_\alpha$ if the rotation arrangement is configured according to the single axis arrangement, wherein $\alpha$ is the rotation angle of the rotary table around the first axis of rotation, or $CT_{\alpha,\beta}$ if the rotation arrangement is configured according to the dual axis arrangement, wherein $\alpha$ is the rotation angle of the swivel arm around the first axis of rotation and $\beta$ is the rotation angle of the rotary table around the second axis of rotation, embedding the coordinate transformation $CT_\alpha$ respectively $CT_{\alpha,\beta}$ into the software by providing an error map $CT^{-1} \circ CT_\alpha$, respectively $CT^{-1} \circ CT_{\alpha,\beta}$.

According to another embodiment, a method is characterised in that the method further includes mounting a weight to the rotary table or to a part of the rotation arrangement and repeating the steps of the inventive method, performing said process/cycle for different kinds of weights, and providing a weight-dependant correction to the coordinate transformation.

A computer program product comprising program code, which is stored on a machine-readable medium, or being embodied by an electromagnetic wave comprising a program code segment, and has computer-executable instructions for performing, particularly when run on a Coordinate Measuring Machine (CMM) of an inventive CMM system, the method according to the disclosed embodiments.

BRIEF DESCRIPTION OF THE DRAWINGS

Such aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically, FIG. 1 an embodiment of the present invention, wherein the rotation arrangement is configured as single axis arrangement.

DETAILED DESCRIPTION

Figure 1:
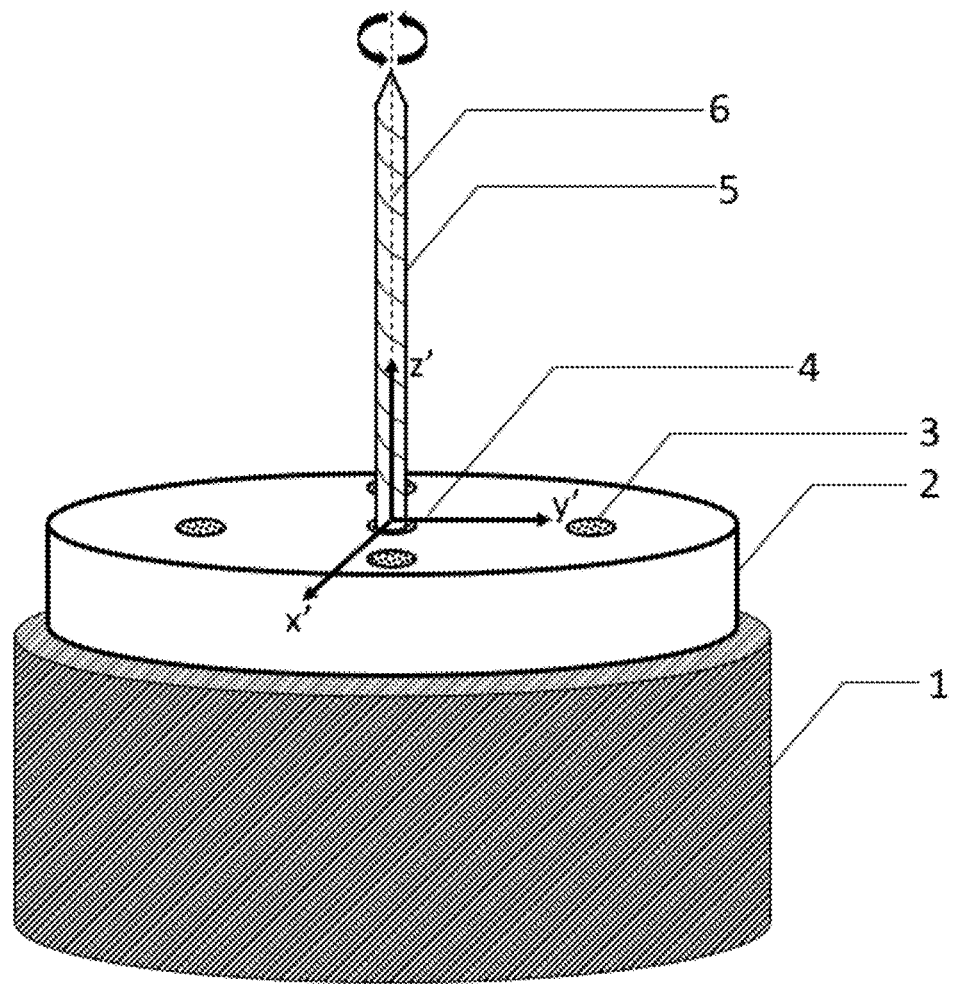

FIG. 1 shows an embodiment, wherein the rotation arrangement is configured as single axis arrangement. The rotary table 2 is mounted to a basis 1, and is rotatable about a first axis of rotation 6. The setting of different angular positions is achieved by rotating the rotary table 2 around the first axis of rotation 6 with respect to the basis 1. A part coordinate system 4 is fixed with respect to the rotary table 2, and is e.g. defined such that the z'-axis is coaxial with the first axis of rotation, and the x'y'-plane lies on the surface of the rotary table 2. Furthermore, the rotary table exhibits means for holding a work piece 5, for example a fixture, herein embodied as simple holes 3.

Figure 2:
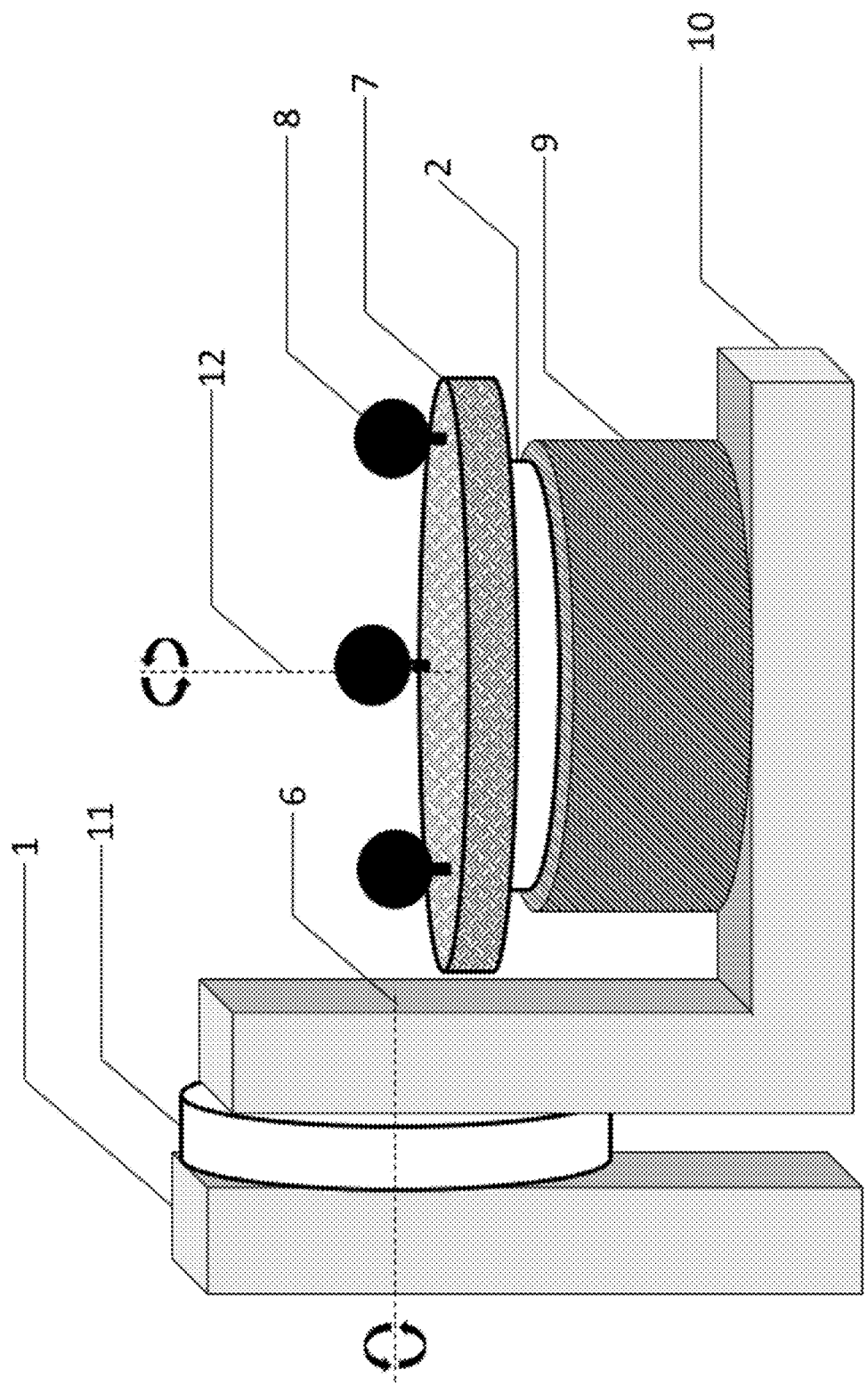
FIG. 2 an embodiment of the present invention in a calibration setup, wherein the rotation arrangement is configured as dual axis arrangement.

FIG. 2 shows an embodiment in a calibration setup, wherein the rotation arrangement is configured as dual axis arrangement. By way of example, the rotary table 2 is mounted to an interjacent component 9, which forms a basis for the rotary table 2, and is rotatable around a second axis of rotation 12 with respect to the interjacent component 9. The interjacent component 9 is fixedly mounted to a swivel arm 10. The swivel arm 10 is rotatably mounted to a basis 1 via a swivel table 11, and is rotatable around a first axis of rotation 6. Furthermore, the swivel arm 10 is constructed, such that the first axis of rotation 6 and the second axis of rotation 12 are nominally perpendicular to each other. A jig consisting of a round plate 7, which is mounted to the rotary table 2, and 3 spheres 8 mounted to the plate 7 is used for a full calibration procedure. The measurement of the 3D coordinates of 3 spheres 8, and thus the 6 dof pose of the jig, generates information about index errors, tilting and translation errors of rotation axes, and wobbling errors.

Figure 3:
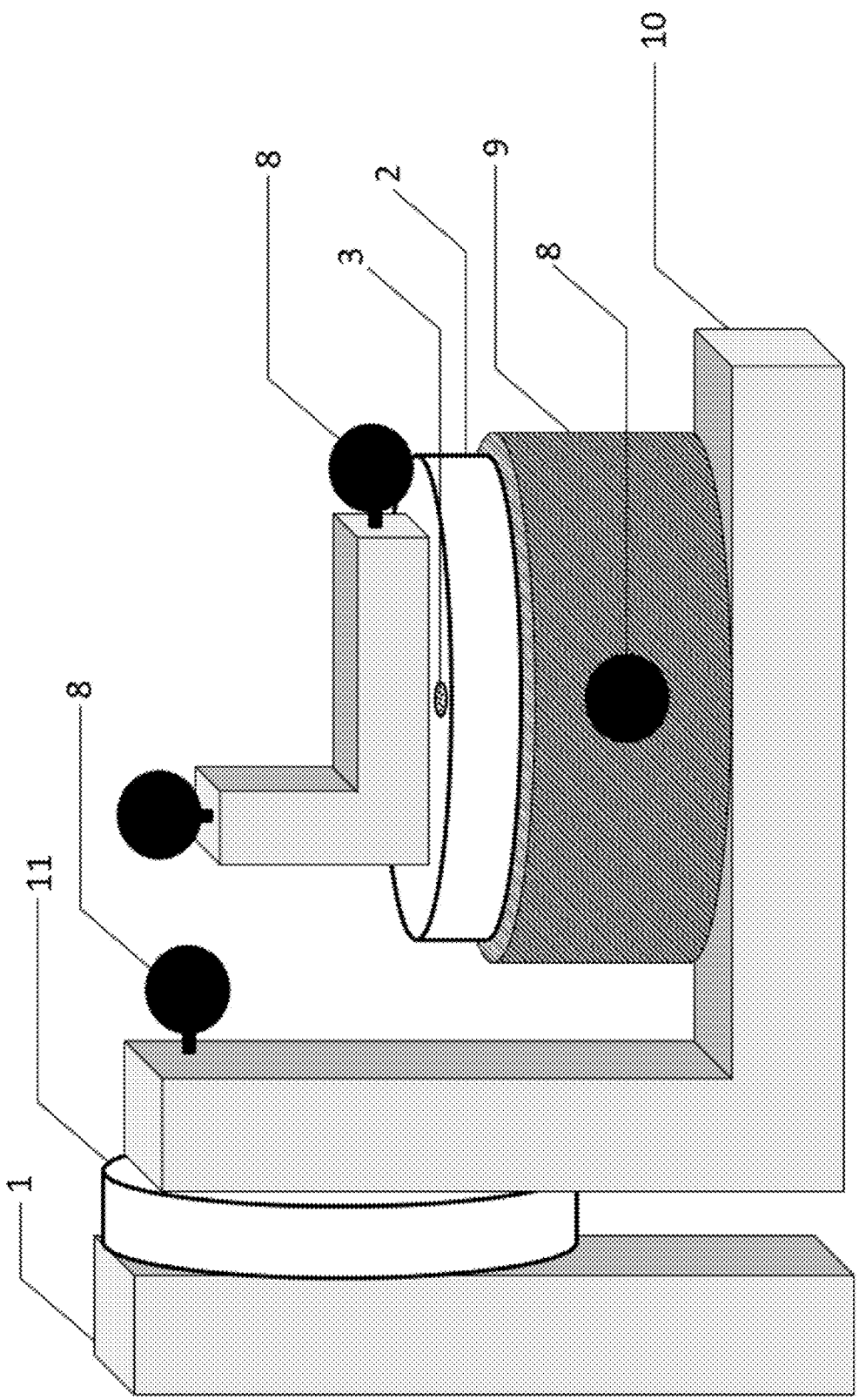
FIG. 3 an embodiment of an inventive calibration setup, wherein the rotation arrangement is configured as dual axis arrangement.

FIG. 3 shows an embodiment of a calibration setup, wherein the rotation arrangement is configured as dual axis arrangement. One or more spheres 8 are used as jig or part of a jig, either to perform a full calibration or to perform a partial calibration. The dual axis arrangement is setup such that the rotary table 2 comprises holes 3 in order to mount a work piece or a jig. The rotary table 2 is rotatably mounted to an interjacent component 9, which is fixedly mounted to a swivel arm 10. The swivel arm 10 is rotatably mounted to a basis 1 of a CMM via a swivel table 11. The swivel arm 10 is constructed, such that the first axis of rotation and the second axis of rotation, which are not shown in this figure, are nominally perpendicular to each other. A jig is either a modular component, which is mountable to the rotary table 2, such as shown for the two spheres 8 fixedly mounted to an L-shaped interjacent component, whereas the jig is solely mounted to the rotary table 2 for calibrating the rotation arrangement, and is removed for the measurement of a work piece. A jig could also be fixedly mounted to a part of the rotation arrangement, such as shown for the sphere 8, which is mounted to the interjacent component 9, or for the sphere 8, which is fixedly mounted to the swivel arm 10.

In some cases, a partial calibration might suffice. If it is known, that the swivel arm 10 is the biggest source of error and the error arising from the rotary table 2 can be neglected, a jig, herein embodied as a sphere 8 could also be fixedly mounted to the swivel arm 10, or the interjacent component 9. For example, spheres 8 that are attached to the static part to which the rotary table 2 is mounted, herein the interjacent component 9, can be used to calibrate the assembly of swivel arm 10 and swivel table 11. Since the rotary table 2 is less error prone to wobble and translation errors than the swivel arm 10 and swivel table 11, one sphere 8 on the rotary table 2 could provide a sufficiently accurate result.

Figure 4:
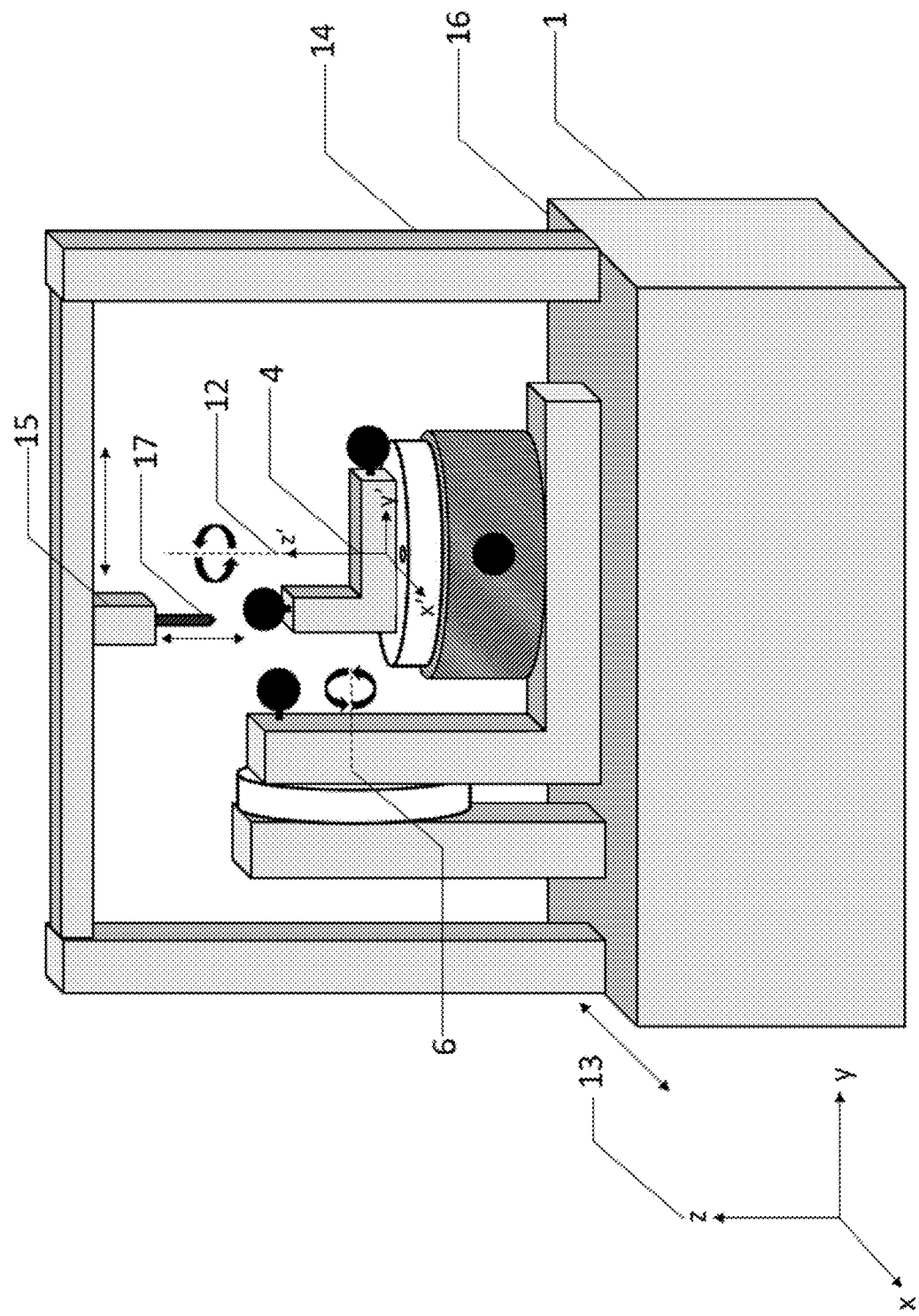
FIG. 4 an embodiment of an inventive CMM system, wherein the rotation arrangement is configured as dual axis arrangement.

FIG. 4 shows an embodiment of a CMM system, wherein the rotation arrangement is configured as dual axis arrangement. The CMM is associated with a CMM coordinate system 13, which is fixed with respect to the CMM. The CMM comprises a measuring table 16, being part of a basis 1, a frame 14, an arm 15 comprising a probe head with a sensor 17. In this example the sensor 17 is embodied as a tactile sensor. The measuring table 16 is fixed with respect to the CMM coordinate system 13. The frame 14 is mounted to the basis 1, such that is movable along the x-axis. The arm 15 is mounted to the frame 14, such that it is movable along the y-axis. The probe head with the attached sensor 17 is mounted to the arm 15, and is movable along the z-axis. The CMM thus offers 3 translational degrees of freedom.

The CMM system comprises a rotational arrangement e.g. one as introduced in [0041] and shown in FIG. 3, which is attached to the basis 1 of the CMM, and a rotary table which is moved into different poses with respect to the CMM by the rotation arrangement. The swivel arm is mounted to the basis 1 and is rotatable with respect to the basis 1 around a first axis of rotation 6, and the rotary table is mounted to the swivel arm and rotatable about a second axis of rotation 12, wherein the swivel arm is constructed, such that the first axis of rotation 6 and the second axis of rotation 12 are nominally perpendicular to each other. In this embodiment, the part coordinate system 4 is defined such, that the second axis of rotation 12 is coaxial to the z'-axis of the part coordinate system 4, and the first axis of rotation 6 is parallel to the y'-axis of the CMM coordinate system 13, in the initial position. The composition of a rotary table and a rotational arrangement thus offers 2 additional degrees of freedom.

During the calibration procedure, the rotary table is moved into multiple poses by rotating the rotary table about different angles around the second axis of rotation 12, or rotating the swivel arm about different angles around the first axis of rotation 6, or both. In every pose, the 3D coordinates of the spheres are measured, such that the 6 dof pose of the jig can be determined. Based on the multiple, angle dependent measurements of the 6 dof pose of the jig in the different angular positions, an error map, a map of all the geometric errors of the composition of rotary table and rotation arrangement, is generated. Based on this error map, a coordinate transformation from the part coordinate system 4 to the CMM coordinate system 13 is generated.

Figure 5:
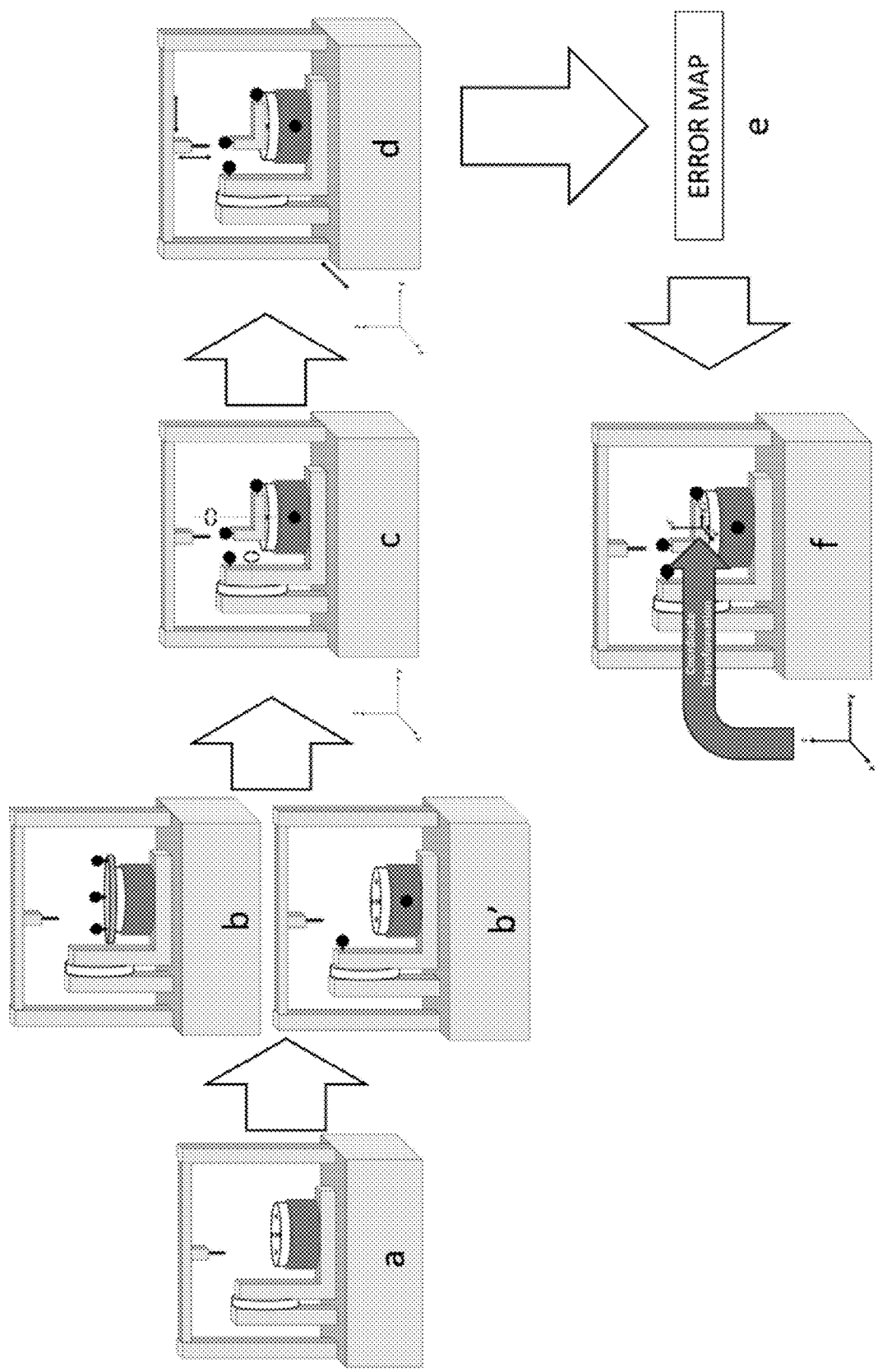
FIG. 5 a workflow of an embodiment the inventive method.

FIG. 5 shows a workflow of an embodiment of the method. An inventive CMM system, in this embodiment comprising a rotation arrangement configured as dual axis arrangement is provided (a). A jig could e.g. be mounted to the rotary table only for calibration and could be removed for the actual measurement (b) or a jig could e.g. be fixedly mounted to a part of a swivel arm or to an interjacent component (b'). After the jig is arranged with respect to the rotary table such that a current pose of the jig is associated with a current pose information of the rotary table with respect to the CMM, the rotary table is moved into multiple poses by setting different angular positions with respect to the rotation movement (c). In this embodiment, where the rotation arrangement is configured as dual axis arrangement, moving the rotary table into multiple poses comprises rotating the swivel arm and/or the rotary table around the first respectively the second axis of rotation. For each of the multiple poses of the rotary table, the 6 dof pose of a jig is measured with at least one of the sensors comprised in the CMM (d). Based on the measured 6 dof poses of the jig, and the angles associated with the different angular positions, respectively poses of the rotary table, an error map is generated (e). Based on this error map, a coordinate transformation from the CMM coordinate system to the part coordinate system is determined (f).

What is claimed is:

1. A Coordinate Measuring Machine (CMM) system operable to measure an object, the CMM system comprising:
   a CMM being associated with a CMM coordinate system which is fixed with respect to the CMM, the CMM comprising a computing unit and at least one sensor for a determination of 3-dimensional coordinates of an object, wherein the CMM comprises a basis being fixed with respect to the CMM coordinate system, wherein the at least one sensor being configured to measure surface variations of an object and being embodied as a tactile sensor and/or an optical sensor,
   a rotary table exhibiting means for holding an object and being associated with a part coordinate system, which is fixed with respect to the rotary table,
   a rotation arrangement attached to the basis and configured to move the rotary table into different poses with respect to the CMM by means of a rotation movement by setting different angular positions with respect to the rotation movement,
   a jig configured to be used for a determination of a 6 degrees of freedom (6 DOF) pose of the jig with the at least one sensor of the CMM, and arranged with respect to the rotary table such that a current pose of the jig is associated with a current pose information of the rotary table with respect to the CMM, wherein the jig exhibits a plurality geometrical features allowing the determination its 6 DOF pose,
   wherein the CMM system provides for a calibration procedure that defines a process in which the rotation arrangement is used to set the rotary table into multiple poses by means of rotation movement, and the calibration procedure is configured to automatically perform:
measuring 3D coordinates of the plurality of geometrical features of the jig with the at least one sensor of the CMM for each of the multiple poses of the rotary table and, based thereof, determining a 6 DOF pose of the jig for each of the multiple poses of the rotary table,
generating an error map with the computing unit, based on the angles associated with the different angular positions, and the associated 6 DOF poses of the jig,
and determining with the computing unit a coordinate transformation from the CMM coordinate system to the part coordinate system, based on the error map.

2. The Coordinate Measuring Machine (CMM) system according to claim 1, wherein the rotation arrangement is configured as:
single axis arrangement, wherein the rotary table is mounted to the basis, and the setting of different angular positions comprises rotating the rotary table around a first axis of rotation with respect to the basis, or
dual axis arrangement, wherein the rotary table is mounted to the basis via an interjacent swivel arm, wherein:
the swivel arm is mounted to the basis and is rotatable with respect to the basis around a first axis of rotation,
the rotary table is mounted to the swivel arm and rotatable about a second axis of rotation, wherein the swivel arm is constructed, such that the first axis of rotation and the second axis of rotation are nominally perpendicular to each other,
wherein the moving of the rotary table into multiple poses comprises rotating the swivel arm and/or the rotary table around the first respectively the second axis of rotation.

3. The Coordinate Measuring Machine (CMM) system according to claim 2, wherein:
the CMM system comprises a software, the software having stored a coordinate transformation described by an angle-dependent matrix CT, wherein the rotation movement is assumed to be provided by aligned and faultless rotation axes,
wherein for the calibration procedure the coordinate transformation from the CMM coordinate system to the part coordinate system is described by an angle-dependent matrix, which takes errors of the rotation axes into account, the matrix being:
$CT_\alpha$ if the rotation arrangement is configured according to the single axis arrangement, wherein a is the rotation angle of the rotary table around the first axis of rotation, or
$CT_{\alpha,\beta}$ if the rotation arrangement is configured according to the dual axis arrangement, wherein a is the rotation angle of the swivel arm around the first axis of rotation and β is the rotation angle of the rotary table around the second axis of rotation,
and wherein the coordinate transformation $CT_\alpha$, respectively $CT_{\alpha,\beta}$ is embedded into the software by providing an error map $CT^{-1} \circ CT_\alpha$, respectively $CT^{-1} \circ CT_{\alpha,\beta}$.

4. The Coordinate Measuring Machine (CMM) system according to claim 1, wherein:
different kinds of weights are mounted to the rotary table or to a part of the rotation arrangement, wherein the CMM is configured to measure, in particular automatically measure, the 6 DOF pose of the jig for different weights, wherein the 6 DOF pose of the jig for each weight is measured for at least a subset of the different angular positions, and the CMM is configured to provide a weight-dependent correction to the coordinate transformation, in particular, wherein in case the rotation arrangement is configured according to the dual axis arrangement the subset of the different angular positions comprises a rotation of the swivel arm around the first axis of rotation and/or a rotation of the rotary table around the second axis of rotation.

5. The Coordinate Measuring Machine (CMM) system according to claim 1, wherein the error map is implemented using harmonic expansion, polynomial expansion or lookup tables.

6. The Coordinate Measuring Machine (CMM) system according to claim 1, wherein the jig is either a modular component, which is mountable to the rotary table, or the jig is fixedly mounted to the rotary table.

7. The Coordinate Measuring Machine (CMM) system according to claim 1, wherein the jig is geometrically stable during the calibration procedure, or the mechanical characteristics and behaviour of the jig during the calibration procedure are stored on the computing unit and taken into account.

8. The Coordinate Measuring Machine (CMM) system according to claim 1, wherein the plurality of geometrical features allow the determination of the 6 DOF pose of at least parts of the rotation arrangement, and the jig is embodied as one of:
a plate with at least three spheres mounted to the plate
a triangle on a plate, particularly a metallic triangle on a plate,
a pattern, in particular a chessboard pattern, on a plate, or identical with the table or part of the table.

9. The Coordinate Measuring Machine (CMM) system according to claim 1, wherein the calibration procedure depends on multiple parameters, in particular multiple degrees of freedom associated to a movement of the rotation arrangement, at least one of the parameters is assumed invariable, and the calibration procedure is performed based on the at least one parameter which is assumed variable.

10. A calibration method for a Coordinate Measuring Machine (CMM) system, the CMM system comprising:
a CMM being associated with a CMM coordinate system which is fixed with respect to the CMM, and comprising a computing unit and at least one sensor for a determination of 3-dimensional coordinates of an object, the at least one sensor being further configured to measure surface variations of an object and being embodied as a tactile sensor or an optical sensor, wherein the CMM comprises a basis being fixed with respect to the CMM coordinate system,
a rotary table exhibiting means for holding an object and being associated with a part coordinate system, which is fixed with respect to the rotary table,
a rotation arrangement attached to the basis and being configured to move the rotary table into different poses with respect to the CMM by means of a rotation movement by setting different angular positions with respect to the rotation movement,
a jig configured to be used for a determination of a 6 degrees of freedom (6 DOF) pose of the jig with at least one of the sensors of the CMM, and arranged with respect to the rotary table such that a current pose of the jig is associated with a current pose information of the rotary table with respect to the CMM, wherein the jig exhibits a plurality of geometrical features allowing the determination its 6 DOF pose, the method comprising the steps of:
moving the rotary table into multiple poses by using the rotation arrangement,
measuring 3D coordinates of the plurality of geometrical features of the jig with the at least one sensor of the CMM for each of the multiple poses of the rotary table,
using the measured 3D coordinates of the geometrical features of the jig for determining a 6 DOF pose of the jig for each of the multiple poses of the rotary table,
generating an error map with the computing unit, based on the angles associated with the different angular positions, and the associated 6 DOF poses of the jig,
and determining with the computing unit a coordinate transformation from the CMM coordinate system to the part coordinate system, based on the error map.

11. The calibration method for a Coordinate Measuring Machine (CMM) system according to claim 10, wherein the rotation arrangement is configured as:
single axis arrangement, wherein the rotary table is mounted to the basis, and the setting of different angular positions comprises rotating the rotary table around a first axis of rotation with respect to the basis, or
dual axis arrangement, wherein the rotary table is mounted to a basis via an interjacent swivel arm, wherein:
the swivel arm is mounted to the basis and is rotatable with respect to the basis around a first axis of rotation,
the rotary table is mounted to the swivel arm and rotatable about a second axis of rotation, wherein the swivel arm is constructed, such that the first axis of rotation and the second axis of rotation are nominally perpendicular to each other,
wherein the moving of the rotary table into multiple poses comprises rotating the swivel arm and/or the rotary table around the first respectively the second axis of rotation.

12. The calibration method for a Coordinate Measuring Machine (CMM) according to claim 10, wherein the method is computer-implemented, and comprises:
providing a software for the Coordinate Measuring Machine (CMM) system, the software having stored a coordinate transformation described by a matrix CT, wherein the rotation movement is assumed to be provided by aligned and faultless rotation axes,
wherein the angle-dependent coordinate transformation from the CMM coordinate system to the part coordinate system is described by a matrix, which takes the tilting errors of the rotation axes into account, the matrix being:
$CT_\alpha$ if the rotation arrangement is configured according to the single axis arrangement, wherein a is the rotation angle of the rotary table around the first axis of rotation, or
$CT_{\alpha,\beta}$ if the rotation arrangement is configured according to the dual axis arrangement, wherein a is the rotation angle of the swivel arm around the first axis of rotation and β is the rotation angle of the rotary table around the second axis of rotation,
embedding the coordinate transformation $CT_\alpha$, respectively $CT_{\alpha,\beta}$ into the software by providing an error map $CT^{-1} \circ CT_\alpha$, respectively $CT^{-1} \circ CT_{\alpha,\beta}$.

13. The calibration method for a Coordinate Measuring Machine (CMM) according to claim 10, further comprising:
mounting a weight to the rotary table or to a part of the rotary arrangement and repeating the steps of the method,
performing said process/cycle for different kinds of weights,
providing a weight-dependent correction to the coordinate transformation.

14. A computer program product comprising program code, which is stored on a non-transient machine-readable medium—that has computer-executable instructions when run on a Coordinate Measuring Machine (CMM) to perform the method according to claim 10.

* * * * *